Dec. 12, 1967  E. M. TRAMMELL, JR  3,357,667

LICENSE PLATE ATTACHMENT

Filed July 28, 1965

INVENTOR.
EARL M. TRAMMELL, JR.
BY
Cohn and Powell
ATTORNEY.

United States Patent Office 3,357,667
Patented Dec. 12, 1967

3,357,667
LICENSE PLATE ATTACHMENT
Earl M. Trammell, Jr., Ladue, Mo. (P.O. Box 435,
St. Louis, Mo. 63166)
Filed July 28, 1965, Ser. No. 475,470
14 Claims. (Cl. 248—201)

ABSTRACT OF THE DISCLOSURE

The attachment includes a pair of fixtures which are each connected to a support member and which, in turn, act to support a license plate spanning between them. Each fixture is slotted to receive one edge of the license plate and each is provided with a fastener extending across the slot and through the license plate to hold the plate in position. A hook is provided on each fastener to attach it to the support.

---

This invention relates generally to improvements in vehicle license plate assemblies and to fixtures utilized in such assemblies.

It is an important object of this invention to provide improved means for attaching a vehicle license plate to a support such as a bumper, the fixtures used being of a type that are quickly and easily installed to both the bumper and the license plate, and which will accommodate license plates within the range of conventional sizes.

An important object is achieved by the provision of a fixture having a body including a side-opening slot that receives an edge of the license plate, a means attachable to the support, and a means extending across the slot and through the license plate to fix the license plate to the body.

Another important objective is realized by the provision of an abutment in the slot against which the plate edge bears to locate the license plate in the slot incident to attachment of the license plate to the body, thereby providing a rigid connection.

Still another important objective is afforded by the structural arrangement in which the side-opening slot in the body defines a front body portion and a rear body portion, and in which the fastening means connecting the license plate edge to the body includes a pin extending through the front body portion, across the slot and through the plate edge therein, through the rear body portion and outwardly beyond the rear body portion. A hook provided on the body is attachable to the support, the support being clamped between the pin and hook.

An important object is attained by the provision of a plug in a hole provided in the rear body portion, the plug being engageable by the pin as the pin extends across the slot and through the license plate edge to push the plug partially out of the hole and beyond the rear body portion to engage the support, the support being clamped between the plug and hook.

Another important objective is provided by a fixture having a hook of a size and shape to interfit and pass through a support plate opening in one relative angular position of the body, and support plate, and to misalign to preclude withdrawal in another relative angular position in which the hook engages behind the support plate. The fastening means connecting the license plate to the fixture body extends through the body and engages the support plate to clamp the support plate between the fastening means and hook.

Yet another important objective is achieved by the structural arrangement of a pair of fixtures connected to the support plate in a pair of spaced openings so that the fixture bodies are disposed in opposed relation with the side-opening slots facing each other and receiving opposite edges of the license plate.

An important object is realized in that the support plate openings are larger than the hook shanks of the respective fixtures at least in one direction to permit the fixture bodies to move selectively toward or away from each other to accommodate any one of a plurality of license plates of different sizes by causing the opposite edges of the license plate to engage abutments of the fixture bodies.

Another important object is afforded by the structural arrangement of a fixture to include a first body portion having a hook connectable in the support plate opening, and a second body portion overlying and attached to the first body portion, the first and second body portions defining a slot therebetween in one side of the fixture, the slot receiving the edge of the license plate. A pin carried by one body portion extends across the slot and through the license plate edge and into a hole provided in the other body portion to attach the license plate.

Other advantages are attained by providing a snap fastener on the first body portion of the fixture that is connectable in the support plate opening, and by connecting the first and second body portions together with a screw that extends through the snap fastener and expands the snap fastener to prevent withdrawal from the support plate opening.

An important objective is realized by the provision of a flange on the overlying second body portion that is received in a recess in the first body member and extends into the support plate opening the flange engaging side stops on the first body member to preclude relative turning of the first and second body portions incident to alignment of such body portions, their interconnection by a screw, and the attachment of the license plate to such body portions by the transverse pin.

It is an important object to provide fixtures for license plate attachments which are simple and durable in construction, economical to manufacture and assembly, highly efficient in usage, and which can be utilized by any one with little or no instructions.

The foregoing and numerous other objects and advantages of the invention will more clearly appear from the following detailed description of a preferred embodiment, particularly when considered in connection with the accompanying drawing, in which.

Figure 1:
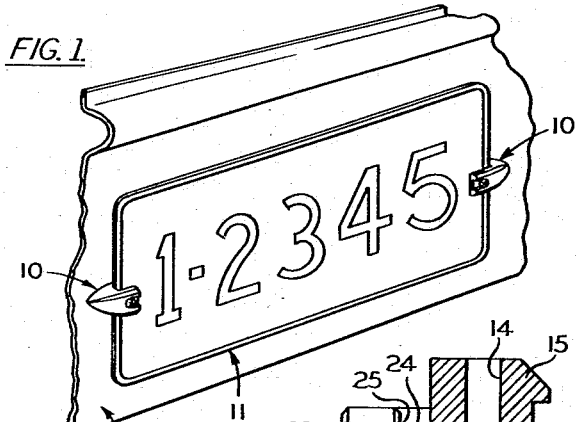
FIG. 1 is a fragmentary, perspective view illustrating a license assembly.

Referring now by characters of reference to the drawing, and first to FIG. 1, it will be seen that a pair of fixtures generally indicated at 10 are utilized to fasten a license plate referred to at 11 to a bumper 12 constituting a support plate. The detailed construction of the fixture 10 and its mounting to the support plate 12 is shown in FIGS. 2–5 inclusive.

The fixture 10 includes a bifurcated body 13 provided with a side-opening slot 14 forming a front body portion 15 and a rear body portion 16. The slot 14 is partially defined by a transverse abutment 17 against which the edge of the license plate 11 bears when located in a slot 14. For reasons which will later appear, the abutment 17 consists of a straight transverse portion 20 (FIG. 4) extending from one side of the body 13 and an integral curved portion 21 extending continuously to the opposite side and toward the end opposite the slot opening.

Extending rearwardly from the body 13 is a hook 22 having an enlarged hexagonally-shaped head 23 and a shank 24. The hook head 23 includes a forwardly facing shoulder 25.

Figure 2:
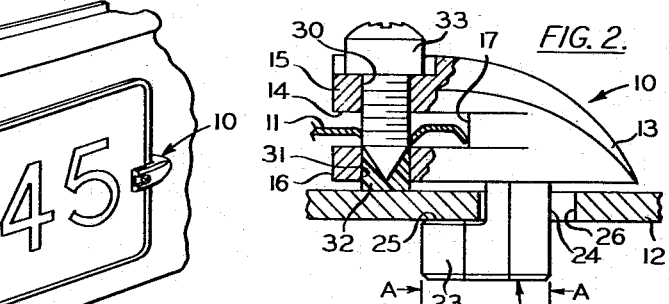
FIG. 2 is an enlarged side elevational view, partly in cross section, illustrating the use of one fixture.
Figure 3:
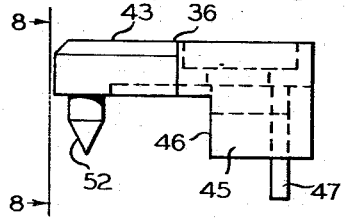
FIG. 3 is a fragmentary front elevational view of the support plate illustrating the support plate opening.
Figure 7:
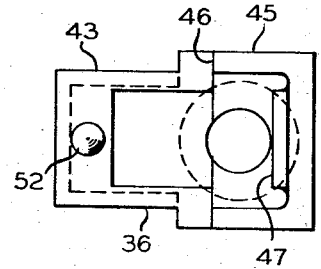
FIG. 7 is a side elevational view of one body portion of the fixture shown in FIG. 6.
Figure 8:
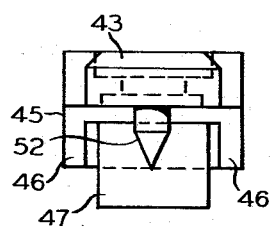
FIG. 8 is a side elevational view of the body portion of FIG. 7 as seen along line 8—8.
Figure 6:
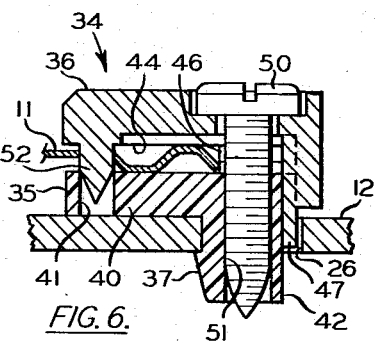
FIG. 6 is a cross sectional view of another embodiment of a fixture connecting the license plate to the support plate.
Figures 9, 10:
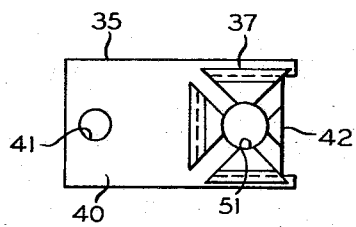
FIG. 9 is a bottom plan view of the body portion shown in FIG. 7.
FIG. 10 is a bottom plan view of the other body portion of the fixture illustrated in FIG. 6.

The support plate 12 includes a pair of spaced, substantially square openings 26, one of which is illustrated in FIGS. 2 and 3. It will be understood that the longitudinal dimension A—A of the hook head 23 in FIG. 2 is slightly less than the diagonal dimension B—B of FIG. 3 so that in one relative angular position of the fixture 10, the head 23 can be inserted into and through the plate opening 26. When the fixture 10 is turned to another relative angular position, after insertion of the hook head 23 through the support plate opening 26, the front facing shoulder 25 moves behind the support plate 12 because the longitudinal dimension A—A of hook head 23 is greater than the side dimension C—C of the support plate opening 26 as indicated in FIG. 3. Therefore, the hook 22 is locked behind the support plate 12 and withdrawal from the opening 26 is selectively prevented.

For reasons which will later appear, it will be understood that the longitudinal thickness of the hook shank 24 is less than the side dimension C—C of the support plate opening 26 so that the fixture 10 can be moved adjustably back or forth in the direction of dimension C—C of support plate opening 26 while maintaining connection of the hook head 23 behind the support plate 12.

The body portions 15 and 16 are provided with aligned tapped holes 30 and 31 respectively, each hole 30 and 31 communicating with the slot 14. Located and fitted within the hole 31 is a plug 32 preferably constructed of a plastic material. A screw 33 constituting a pin is carried by the body portion 15, the screw 33 being threadedly received in the tapped hole 30. Upon tightening the screw 33, the screw 33 moves across the slot 14, punctures and moves through the edge of the license plate 11 located within the slot 14, and moves into the tapped hole 31 and engages the plug 32. Upon continued tightening of the screw 33, the screw will force the plug 32 partially out of the hole 31 and beyond the rear body portion 16, and urge the plug 32 against the support plate 12. Thus, the license plate 11 is fixed to the fixture body 13, and the support plate 12 is clamped between the plug 32 and the hook shoulder 25.

To assembly a license plate 11 with a pair of fixtures 10 to a support plate 12, as shown in FIG. 1, one of the fixtures 10 is attached to the support plate 12 by angularly locating the fixture body 13 in a position so that the longitudinal dimension A—A of its hook head 23 is aligned with the diagonal dimension B—B of the support plate opening 26, and then inserting the hook 22 into and through the opening 26, and then turning the fixture body 13 to another angular position to lock the hook head 23 behind the support plate 12 to preclude withdrawal from the opening 26. In this last said angular position, the side-opening of body slot 14 faces in a direction toward the other spaced support plate opening 26.

One edge of the license plate 11 is inserted into the slot 14 of the first placed fixture body 13, the license plate edge being forced against the body abutment 17.

The other fixture body is attached to the support plate 12 in a similar manner by inserting the hook 22 into and through the support plate opening 26 and turning the body 13 so that the opposite license plate edge is located in its associated slot 14. The curved portion 21 of the body abutment 17 enables the straight edge of the license plate to move into the slot 14 as the fixture body 13 is moved from the angular position assumed during insertion of the hook 22 into the support plate opening 26 to the other angular position in which the hook head 23 is misaligned with the opening 26 to lock behind the support plate 12.

With the fixtures 10 locked to the support plate 12 in a manner to preclude withdrawal from the associated openings 26, and with the fixture bodies disposed so as to receive opposite edges of the license plate 11 in the respective slots 14, the fixture bodies 13 are urged toward each other to assure that the edges of the license plates bear against the associated abutments 17 in order to locate the license plate 11 accurately. The fixtures 10 can move toward or away from each other to provide this result because the hook shanks 24 can move in the support plate openings 26 in this direction.

When the license plate 11 is located in the desired position with respect to the fixtures 10, each of the screws 33 is threadedly tightened so that such screw punctures the license plate edge in moving across the body slot 14 and engages the associated plug 32, to force such plug 32 against the support plate 12. The screw 33 fixes the license plate to the fixture 10, and clamps the support plate 12 between the plug 32 and the hook shoulder 25. When completely installed in this manner, the fixtures 10 are rigidly secured to the support plate 12, and the license plate 11 is rigidly secured to the fixtures 10.

Instead of the screw 33 puncturing the license plate 11, the license plate 11 may be provided with side apertures (not shown) through which the screws will freely move. In either event, the result will be the same. The screw 33 in moving through such aperture will fix the license plate edge to the fixture body 13.

To disassemble the license plate 11, in the event a change of license plates is necessary, the screws 33 of the fixtures 10 are merely backed off until such screws disengage from the license plate edges received in the body slots 14. Then the license plate 11 may be simply slipped out of engagement with the fixtures 10, and a new plate inserted. In the event that the fixtures 10 have to be removed after the license plate 11 has been detached, each fixture 10 is simply turned to the angular position in which the longitudinal dimension A—A of the hook head 23 is aligned with the diagonal dimension B—B of the support plate opening 26 so that the hook 22 can be withdrawn.

Another embodiment of a fixture that can be used to attach a license plate is illustrated in FIGS. 6–10 inclusive and is generally indicated by 34. In this embodiment, the fixture 34 includes a first body portion 35 preferably constructed of a plastic material, and a second body portion 36 preferably constructed of metal.

The body portion 35 includes a snap fastener 37 constituting a hook, the snap fastener having a plurality of resilient leg portions. Integrally connected to the snap fastener 37 is a flat base 40 having a hole 41 in one end. The body portion 35 is installed or fixed to the support plate 12 by inserting the snap fastener 37 into and through the support opening 26. In moving through the support plate opening 26, the resilient leg portions are retracted until fully inserted, at which point the resilient leg portions expand and snap outwardly to engage behind the support plate 12 to preclude unintentional withdrawal from the opening 26. In this completely installed position the base 40 lies flat against the front face of the support plate 12.

For reasons which will later appear, one leg portion is cut away to provide a flat shoulder 42 in order to provide a recess 38 defined laterally by stops 39, the recess 38 being aligned over the support plate opening 26.

The other body portion 36 provides a top 43 that overlies the base 40 of the first body portion 35 in spaced relation to provide a side-opening slot 44 therebetween. A pair of integral side flanges 45 fit down over and embrace the sides of the first body portion 35, the side flanges 45 providing abutments 46 at the rear of the slot 44 against which the edge of the license plate 11 bears when located in the slot 44 between the body portions 35 and 36.

Extending downwardly from the end of the second body portion 36 is a flange 47 that is of sufficient length to extend into the recess 38 and into the support plate opening 26. The interfitting connection of flange 47 in the recess 38 and engagement with stops 39 preclude relative turning of the body portions 35 and 36 when the second body portion 36 is fitted over the first portion 35 incident to attachment.

The first and second body portions 35 and 36 are interconnected by a screw 50 threadedly received in a tap bore 51 formed in the first body portion 35 and extending through the snap fastener 37. As the screw 50 is tightened, the body portion 36 is brought down on and secured to the lower body portion 35. As tht screw 50 moves through the bore 51, the screw 50 tends to urge the resilient arms of the snap fastener 37 laterally outward into engagement behind the support plate 12 and precludes the resilient arms from being retracted to a position in which the snap fastener 37 could be withdrawn from the support opening 26. The snap fastener 37 is locked behind the support plate 12 by the screw 50.

The body portion 36 includes an integral pin 52 having a point, the pin 52 extending across the slot 44 and received in the hole 41 of the other body portion 35. When the license plate 11 is located within the slot 44 with its edge bearing against the abutment 46, and when the body portion 36 is secured to the body portion 35 upon partial tightening of screw 50, the flat surface of the body portion top 43 can be tapped with a suitable tool so that the pin 52 punctures the license plate 11 and moves into the hole 41, thereby securing the license plate 11 to this fixture. Then, the screw 50 is tightened completely to fix the body portions 35 and 36 securely together. With this structural arrangement, it is seen that the body portions 35 and 36 of the fixture 34 are fixed securely to the support plate 12 by the snap fastener 37 and the interconnecting screw 50, and that the license plate 11 is fixed to and between the body portions 35 and 36 within the slot 44 by pin 52. Thus, the license plate is rigidly secured to the support plate 12.

Figure 5:
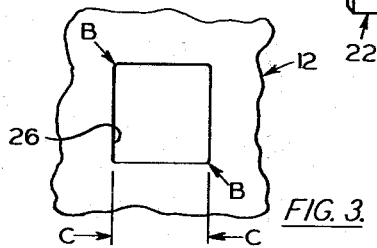
FIG. 5 is a cross sectional view as seen along line 5—5 of FIG. 4.
Figure 4:
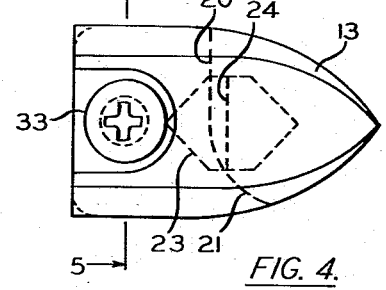
FIG. 4 is a top plan view of the fixture shown in FIG. 2.

It will be understood that the pin 52 can be a separate element press-fitted or otherwise attached to the top 43 of the body portion 36 in lieu of the integral formation disclosed in FIG. 5. Moreover, it will be understood that this pin connection could have a reverse construction in that the pin 52 could be formed on the base 40 of the body portion 35 and that the coacting hole 41 could be formed in the top 43 of the other body portion 36.

To install a license plate 11 to a support plate 12 utilizing two of the fixtures 34, the body portions 35 of such fixtures 34 are secured in place first by inserting the snap fasteners 37 into the spaced support plate openings 26. The body portions 35 are disposed so that their bases 40 extend toward each other. Then the license plate 11 is disposed between the body portions 35 with its opposite edges located over the bases 40.

The body portion 36 of each fixture 34 is located over its associated body portion 35 with its abutments 46 engaging the edge of the license plate 11 and with its flange 47 inserted into the recess 38. The body portion 36 of each fixture 34 is secured to its associated body portion 35 by insertion and partial tightening of the screw 50. The outer surface of the body portion 36 is struck a sharp blow with a suitable tool so that the pin 52 of each fixture 34 punctures the license plate 11 and moves into its compatible hole 41. Then, the screw 50 of each fixture 34 can be tightened completely to secure the body portions 35 and 36 together.

Thus it is seen that the license plate 11 is rigidly secured to and between a pair of fixtures 34, and that such fixtures 34 are fixed to the support plate 12 in the spaced support plate openings 26.

To disassemble the license plate 11, in the event the license plate need be changed, the screws 50 of the fixtures 34 are simply removed so that the body portions 36 can be separated from their associated body portions 35, and thereby disconnect the pins 52 from the license plate 11. Another license plate can be applied over the spaced body portions 35 that remain attached to the support plate 12, and can be secured by attaching the body portions 36 in the same manner as described previously.

In the event that it is desired to remove all parts of the fixtures 34 incident to disassembly of the license plate, the resilient arms of the snap fasteners 37 of the body portions 35 are retracted and the snap fasteners 37 are pushed out of the support plate openings 26. The snap fasteners 37 can be flexed in this manner in view of the fact that the screws 50 have been removed.

Although the invention has been described by making detailed reference to preferred embodiments, such detail is to be understood in an instructive, rather than in any restrictive sense, many variants being possible within the scope of the claims hereunto appended.

I claim as my invention:

1. In a license plate attachment:
   (a) a support plate provided with an opening,
   (b) a fixture comprising a first body portion and a second body portion providing a side-opening slot therebetween receiving the edge of the license plate,
   (c) a fastening means carried by one of the body portions and extending across the slot and through the license plate edge and into the other body portion to attach the license plate, and
   (d) means extending through the support plate opening and connecting the fixture to the support plate.

2. In a license plate attachment:
   (a) a support plate provided with an opening,
   (b) a fixture comprising a first body portion including a hook connectable in the opening, and
   (c) a second body portion overlying and attached to the first body portion,
   (d) the body portions defining a slot therebetween in one side of the fixture, the slot receiving an edge of the license plate, and
   (e) one of the body portions having a fastening means extending across the slot and through the license plate edge and into the other body portion to attach the license plate.

3. In a license plate attachment:
   (a) a support plate provided with an opening,
   (b) a fixture comprising a first body portion including a hook connectable in the opening, and
   (c) a second body portion overlying and attached to the first body portion,
   (d) the body portion defining a slot therebetween in one side of the fixture, the slot receiving an edge of the license plate,
   (d) a pin carried by one body portion, and
   (e) the other body portion being provided with a hole receiving the pin,
   (f) the pin extending across the slot and puncturing the license plate therein to attach the license plate to the fixture.

4. A fixture for attaching a license plate to a support, comprising:
   (a) a body provided with a side-opening slot defining a front body portion and a rear body portion, the slot receiving the edge of the license plate between the front and rear body portions, (b) the front and rear body portions being provided with aligned holes extending from the front through the back of the body,
(c) a plug in the rear body portion hole,
(d) a pin extending through the front body portion hole, through the plate edge in the slot, and into the rear body portion hole to engage the plug and push the plug partially out of the hole and beyond the rear body portion, and
(e) a hook on the body having a front-facing shoulder behind the rear body portion and attachable to the support.

5. In a license plate attachment:
(a) a support plate provided with an opening,
(b) a fixture comprising a body having a slot in one side receiving the edge of the license plate,
(c) a hook on the body, the hook being of a size and shape to interfit and pass through the support plate opening in one relative angular position of the body and support plate, and to misalign to preclude withdrawal in another relative angular position in which the hook engages behind the support plate, and
(d) a fastening means carried by the body, the fastening means selectively extending through the slot and license plate therein to fix the license plate to the body, and extending through the body to engage the support plate to clamp the support plate between the fastening means and hook.

6. In a license plate attachment:
(a) a support plate provided with an opening,
(b) a fixture comprising a body provided with a side-opening slot defining a front body portion and a rear body portion, the slot receiving the edge of the license plate between the front and rear body portions,
(c) the body including an abutment in the slot against which the plate edge bears to locate the plate in the slot,
(d) a pin carried by the body, the pin extending through the front body portion, across the slot and through the plate edge therein, through the rear body portion and outwardly beyond the rear body portion, and
(e) a hook on the body, the hook being of a size and shape to interfit and pass through the support plate opening in one relative angular position of the body and support plate, and to misalign to preclude withdrawal in another relative angular position in which the hook engages behind the support plate,
(f) the support plate being clamped between the pin and hook.

7. In a license plate attachment:
(a) a support plate provided with an opening,
(b) a fixture comprising a body provided with a side-opening slot defining a front body portion and a rear body portion, the slot receiving the edge of the license plate between the front and rear body portions,
(c) the front and rear body portions being provided with aligned holes extending from the front through the back of the body,
(d) a plug in the rear body portion hole,
(e) a pin extending through the front body portion hole, through the plate edge in the slot and into the rear body portion hole to engage the plug and push the plug partially out of the hole and beyond the rear body portion, and
(f) a hook on the body, the hook being of a size and shape to interfit and pass through the support opening in one relative angular position of the body and support plate, and to misalign to preclude withdrawal in another relative angular position in which the hook engages behind the support plate,
(g) the support plate being clamped between the plug and the hook.

8. In a license plate attachment:
(a) a support plate provided with a pair of spaced openings;
(b) a pair of fixtures, each fixture comprising a body having a slot in one side receiving an edge of the license plate,
(c) a hook on the body being of a dimension to pass through one opening in one relative angular position of the body and support plate, and to preclude withdrawal in another relative angular position in which the hook engages behind the support plate, and
(d) a fastening means carried by the body, the fastening means selectively extending into the slot and engaging the license plate therein to clamp the license plate to the body.

9. In a license plate attachment:
(a) a support plate provided with a pair of spaced openings,
(b) a pair of fixtures, each fixture comprising a body having a slot in one side,
(c) a hook on the body being of a dimension to pass through one opening in one relative angular position of the body and support plate, to preclude withdrawal in another relative angular position in which the hook engages behind the support plate,
(d) the bodies being disposed in opposed relation with the slots facing each other and receiving opposite edges of the license plate, and
(e) a fastening means carried by each body, the fastening means selectively extending through the slot and license plate therein to fix the license plate to the body, and extending through the body to engage the support plate to clamp the support plate between the fastening means and hook.

10. In a license plate attachment:
(a) a support plate provided with a pair of spaced openings,
(b) a pair of fixtures, each fixture comprising a body having a slot in one side,
(c) a hook on the body having a head and shank, the head being of a dimension to pass through one opening in one relative angular position of the body and support plate, and to preclude withdrawal in another relative angular position in which the hook head engages behind the support plate,
(d) the bodies being disposed in opposed relation with the slots facing each other and receiving opposite edges of the license plate,
(e) each body including an abutment in the slot against which the associated license plate edge bears to locate the license plate in the slot,
(f) the support plate openings being larger than the hook shanks at least in one direction to permit the fixture bodies to move selectively toward or away from each other to accommodate the license plate and to engage the opposite edges of the license plate with the abutments, and
(g) a fastening means carried by each body, the fastening means selectively extending into the slot and engaging the license plate edge therein to clamp the license plate to the body.

11. A license plate attachment as defined in claim 15, in which:
(h) the slot in each body defines a front body portion and a rear body portion, and
(i) the fastening means for each fixture comprises a pin carried by the body, the pin extending through the front body portion, across the slot and through the license plate edge therein, through the rear body portion and outwardly beyond the rear body portion.

12. In a license plate attachment:
(a) a support plate provided with an opening,
(b) a fixture comprising a first body portion including a snap fastener connectable in the opening, and (c) a second body portion overlying the first body portion,
(d) the body portions defining a slot therebetween in one side of the fixture, the slot receiving an edge of the licensing plate,
(e) a fastening element extending through and interconnecting the first and second body portions,
(f) the fastening element expanding the snap fastener to prevent withdrawal from the support plate opening,
(g) a pin carried by one body portion, and
(h) the other body portion being provided with a hole receiving the pin,
(i) the pin extending across the slot, through the license plate therein and into the body portion hole to attach the license plate to the fixture.

13. In a license plate attachment:
(a) a support plate provided with an opening,
(b) a fixture comprising a first body portion including a hook connectable in the opening, and
(c) a second body portion overlying and attached to the first body portion,
(d) the body portions defining a slot therebetween in one side of the fixture, the slot receiving an edge of the license plate,
(e) the first body portion including a recess aligned with the support plate opening and defined by side stops,
(f) the second body portion including a flange disposed in the recess and support plate opening and engaging the side stops to preclude relative turning of the first and second body portions,
(g) a pin carried by one body portion, and
(h) the other body portion being provided with a hole receiving the pin,
(i) the pin extending across the slot and through the license plate edge therein and into the body portion hole to attach the license plate to the fixture.

14. A fixture for attaching a license plate to a support, comprising:
(a) a first body portion and a second body portion providing a side-opening slot therebetween receiving the edge of the license plate,
(b) a fastening means carried by one of the body portions and extending across the slot and through the license plate edge and into the other body portion to attach the license plate,
(c) attaching means on one of the body portions adapted to attach the fixture to the support, and
(d) the fastening means and attaching means being spaced to provide a couple preventing rotation of the fixture.

References Cited

UNITED STATES PATENTS

| | | | |
|---|---|---|---|
| 2,445,009 | 7/1948 | Strauss | 248—200 X |
| 3,039,728 | 6/1962 | Sova | 248—316 |
| 3,049,323 | 8/1962 | Peterka | 248—466 |
| 3,134,565 | 5/1964 | Trifiletti | 248—466 |

ROY D. FRAZIER, *Primary Examiner.*

K. J. WINGERT, *Assistant Examiner.*